March 31, 1953 G. V. ELTGROTH 2,633,529

FREQUENCY SELECTIVE NETWORK

Filed May 3, 1950 5 Sheets-Sheet 1

INVENTOR.

George V. Eltgroth

INVENTOR.
George V. Eltgroth

March 31, 1953 G. V. ELTGROTH 2,633,529

FREQUENCY SELECTIVE NETWORK

Filed May 3, 1950 5 Sheets-Sheet 3

INVENTOR.

George V. Eltgroth

March 31, 1953 G. V. ELTGROTH 2,633,529

FREQUENCY SELECTIVE NETWORK

Filed May 3, 1950 5 Sheets-Sheet 4

INVENTOR.

INVENTOR.
George V. Eltgroth

Patented Mar. 31, 1953 2,633,529

UNITED STATES PATENT OFFICE 2,633,529

FREQUENCY SELECTIVE NETWORK

George V. Eltgroth, Philadelphia, Pa.

Application May 3, 1950, Serial No. 159,686

17 Claims. (Cl. 250—27)

Figure 1:
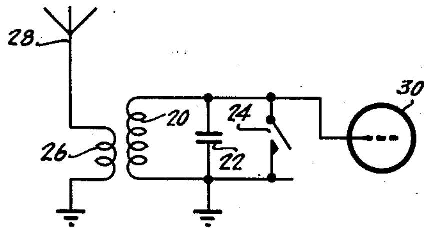

This invention relates to frequency selective networks and more particularly to such a network characterized by improved rejection of undesired signals without materially affecting the fidelity of response to the intelligence modulation on the selected signal.

Since the early days of wireless communication and the use of carrier waves as a medium for the transmission of intelligence, there has been an unremitting effort to provide for more effective utilization of the always limited spectrum space and to improve the reliability with which intelligence may be transmitted. With the old tuned radio frequency receivers, the channel spacing or separation between the assigned carrier frequencies of transmitting stations was limited by the practically attainable selectivity of circuits operating at the frequency level of the originally transmitted carrier frequency. This was later overcome by the use of the superheterodyne principle, which relegates the problem of adjacent channel selectivity to an intermediate frequency amplifier, usually operating at a frequency lower than the carrier frequency employed in the original transmission. Such an amplifier could attain greater selectivity in practice because it could be designed for operation at a single frequency, using arrangements commercially inexpedient in an amplifier which is to be continuously tunable, and because of the fundamental simplification of the problem of attaining great selectivity at the lower intermediate frequencies usually employed.

While one group of engineers was overcoming the obstacles to the practical realization of greater selectivity, another was engaged in improving the fidelity available from components operating at audio frequencies, to make the reproduced intelligence a more faithful replica of the original. Ultimately, it became apparent that the improved selectivity of the frequency discriminating circuits was stripping a portion of the initial intelligence, that arising from the higher frequencies, from the received carrier before demodulation. Hence, it became apparent that channels would have to be spaced in the frequency spectrum by an amount of the order of twice the highest intelligence frequency to be transmitted, if both transmitters radiated similar material, or the sum of the respective highest frequencies to be transmitted if both transmitters radiated dissimilar material. In special instances, further improvement was attained by the use of single sideband transmission, but this represents about the present limit.

There have further been many efforts through the years to improve the signal to noise ratio in the receiver output over that existing at the receiver input. Additional selectivity improves this ratio only within certain restrictions, for the selectivity cannot be increased without limit, else the intelligence modulation would disappear.

The most successful noise reducing system to date are the gates and limiters. The use of other transmission systems than amplitude modulation, such as frequency modulation and pulse or pulse code modulation also afford considerable improvement, but demand so much spectrum space that such transmitters are relegated to the higher frequency portions of the electromagnetic spectrum where the bands are less crowded, but the propagation characteristics are such as to provide relatively limited range communication.

Selective circuits constructed in accordance with the principles of the invention permit great attenuation of undesired adjacently disposed signals without corresponding impairment of the transmission of sideband energy associated with the desired signal. They further reduce the effects of selective fading and afford substantial noise reduction.

It is a primary object of the invention to provide a new and improved frequency selective network.

Another object of the invention is to provide method and apparatus for attenuating undesired adjacent channel signals without correspondingly affecting the intelligence modulation on the desired signal.

A further object of the invention is to reduce the response of signal circuits to noise impulses without substantially affecting the response of such circuit to a desired signal.

Still another object of the invention is to permit the closer spacing of intelligence bearing carriers within the available frequency spectrum.

Yet another object of the invention is to permit the transmission of more intelligence within a given frequency band.

Another object of the invention is to provide suitable auxiliary apparatus for periodically absorbing energy from oscillatory circuits.

Figure 2:
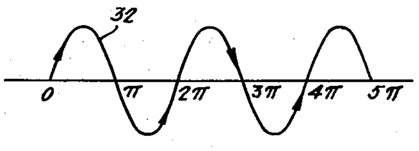
Figure 3:
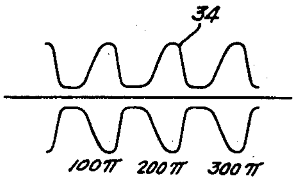
Figure 4:
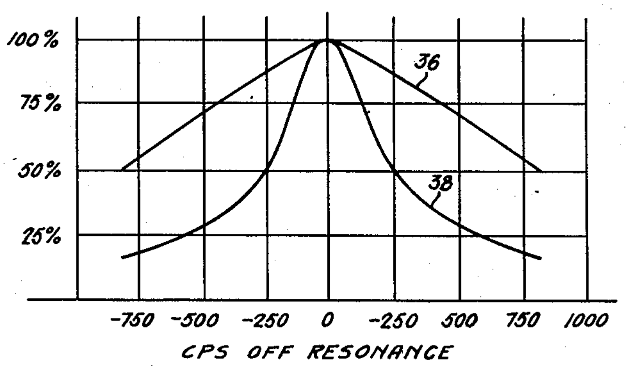
Figure 5:
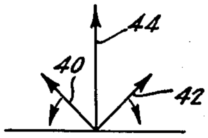
Figure 7:
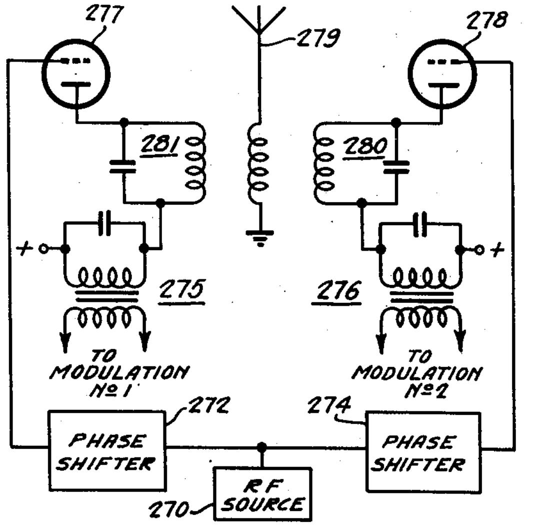
Figure 6:
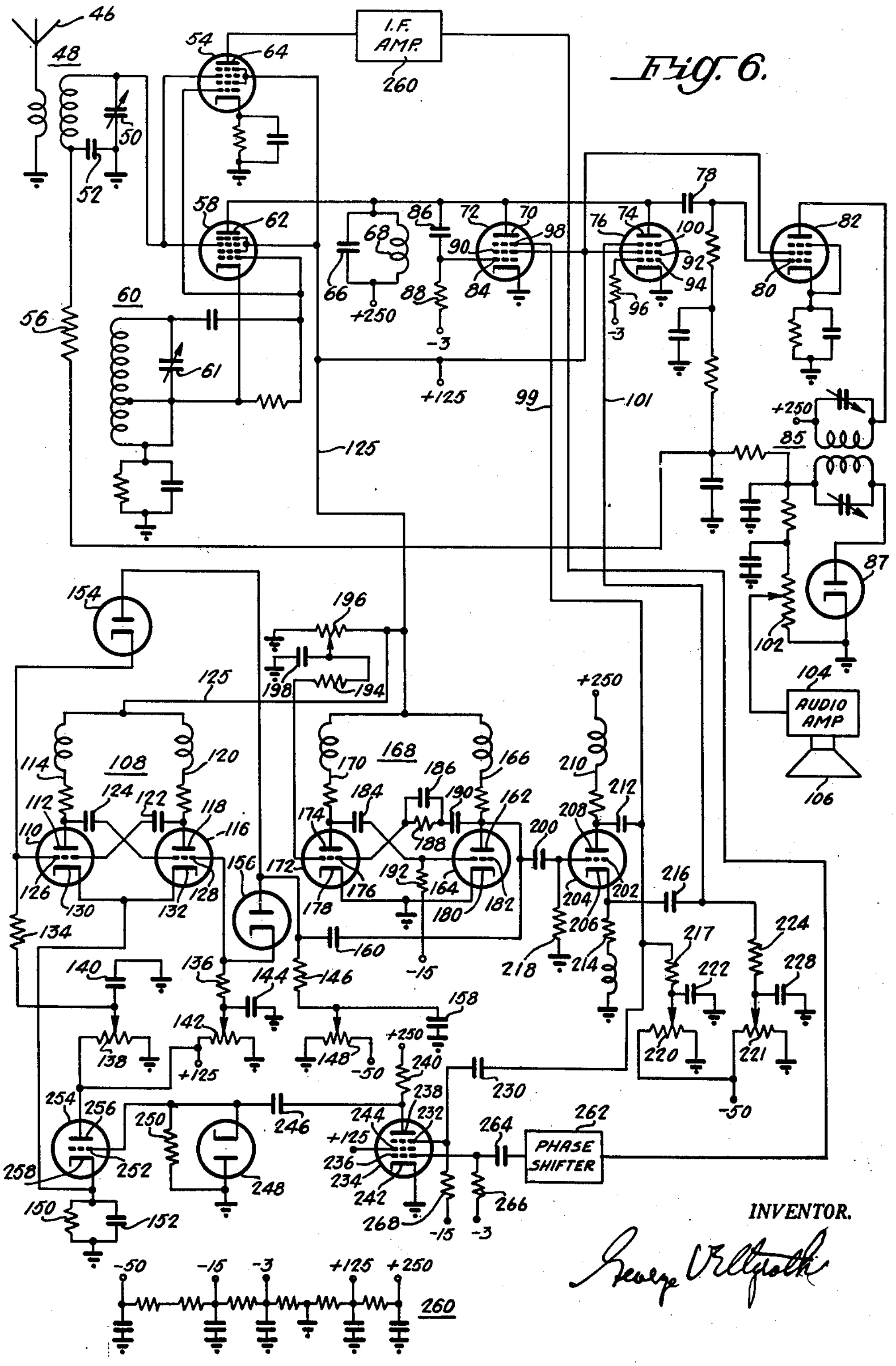

Other objects and advantages of the invention will in part be disclosed and in part be obvious when the following description is read in conjunction with the drawings in which:

Figure 1 schematically illustrates a circuit from which the basic aspects of the invention are readily understood, Figure 2 illustrates the voltage wave which may be observed across the circuit of Figure 1, Figure 3 illustrates graphically the envelope of the signal observed across the circuit of Figure 1 when excited by a signal having a frequency other than the desired signal, Figure 4 graphically illustrates comparative frequency responsive curves for a conventional circuit and the circuit of the invention, Figure 5 is a vector diagram illustrating the vector relation between the carrier and the sidebands of an amplitude modulated wave, Figure 6 schematically illustrates a receiving system incorporating the principles of the invention, Figure 7 illustrates a transmitting system which may be used to double the amount of conveyd intelligence.

Figures 8, 9, 10:
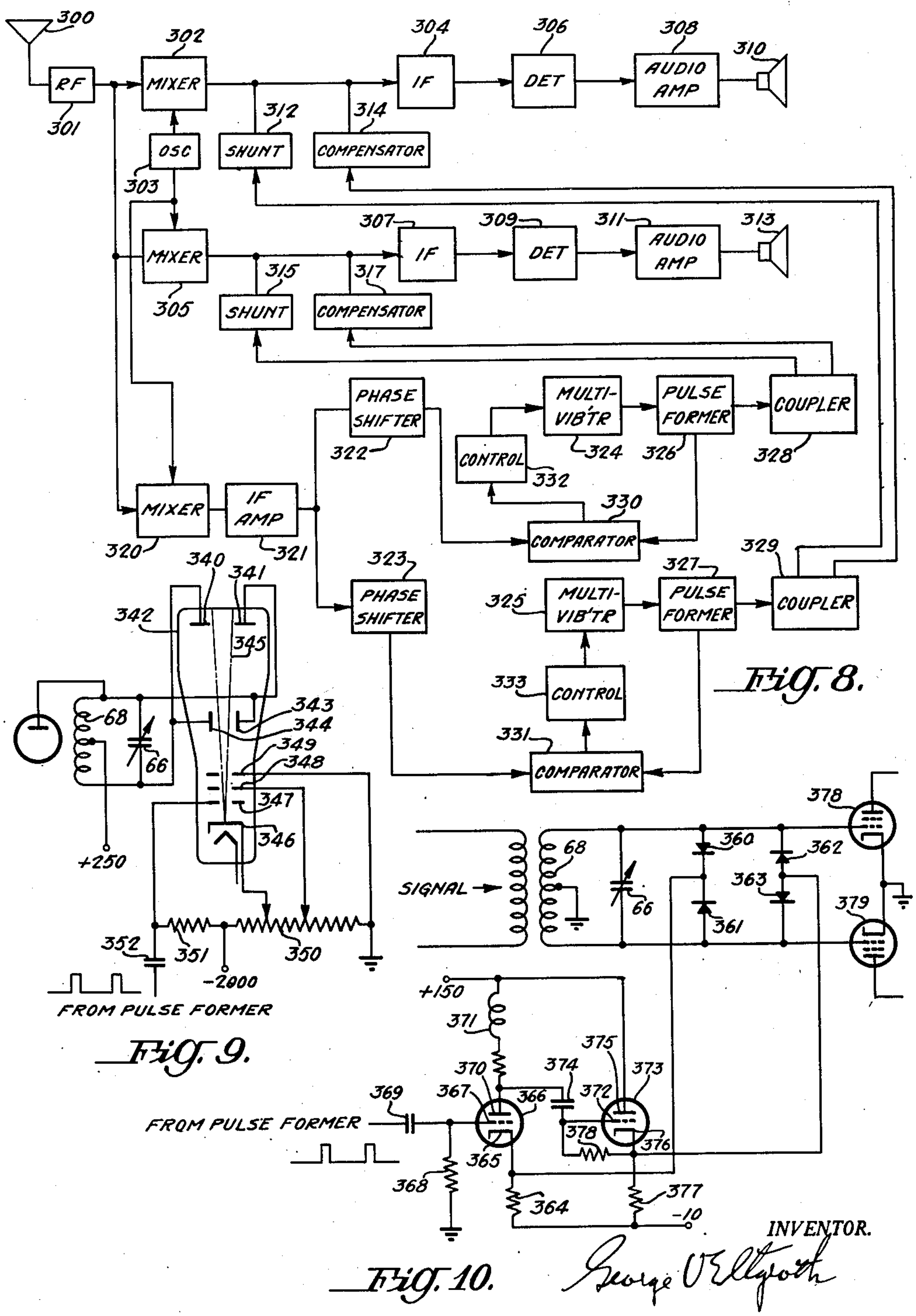
Figure 11:
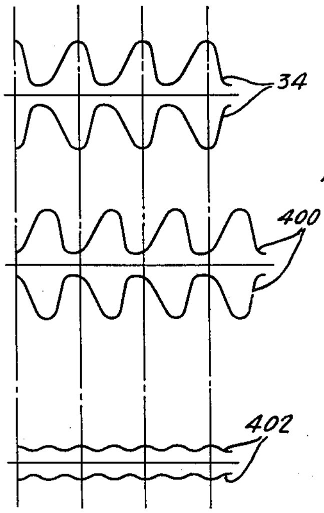
Figure 12:
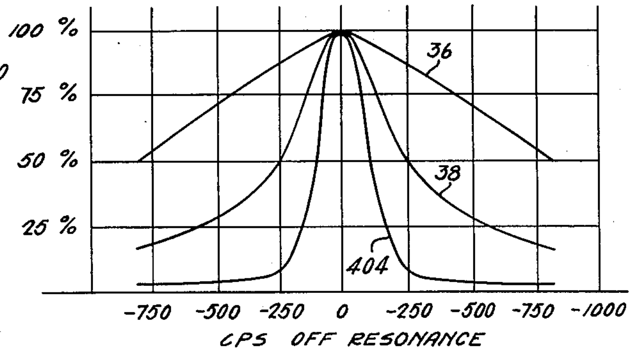
Figure 13:
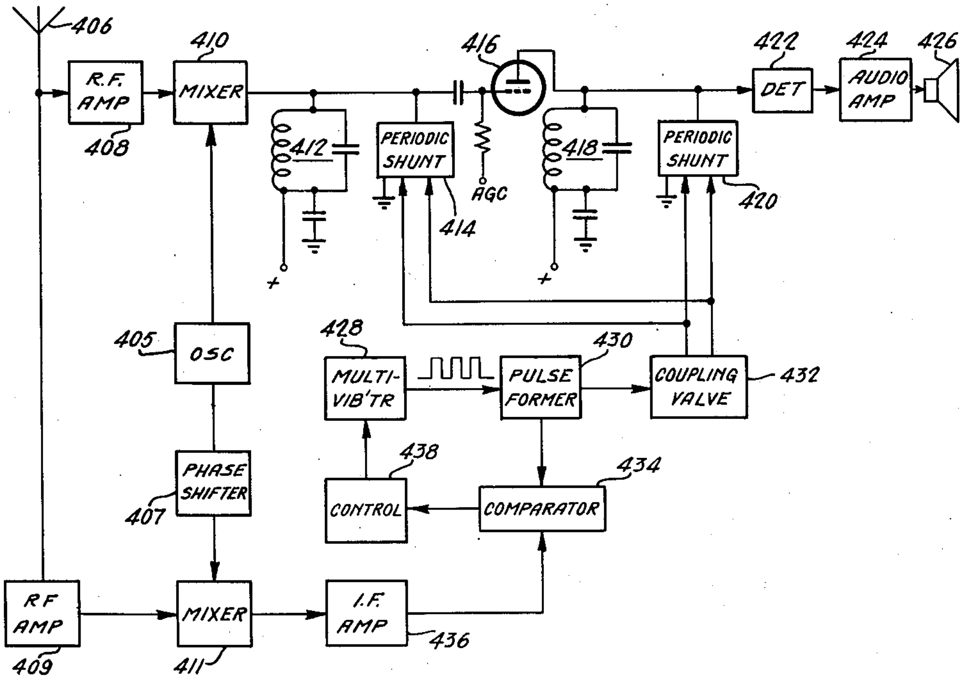
Figure 14:
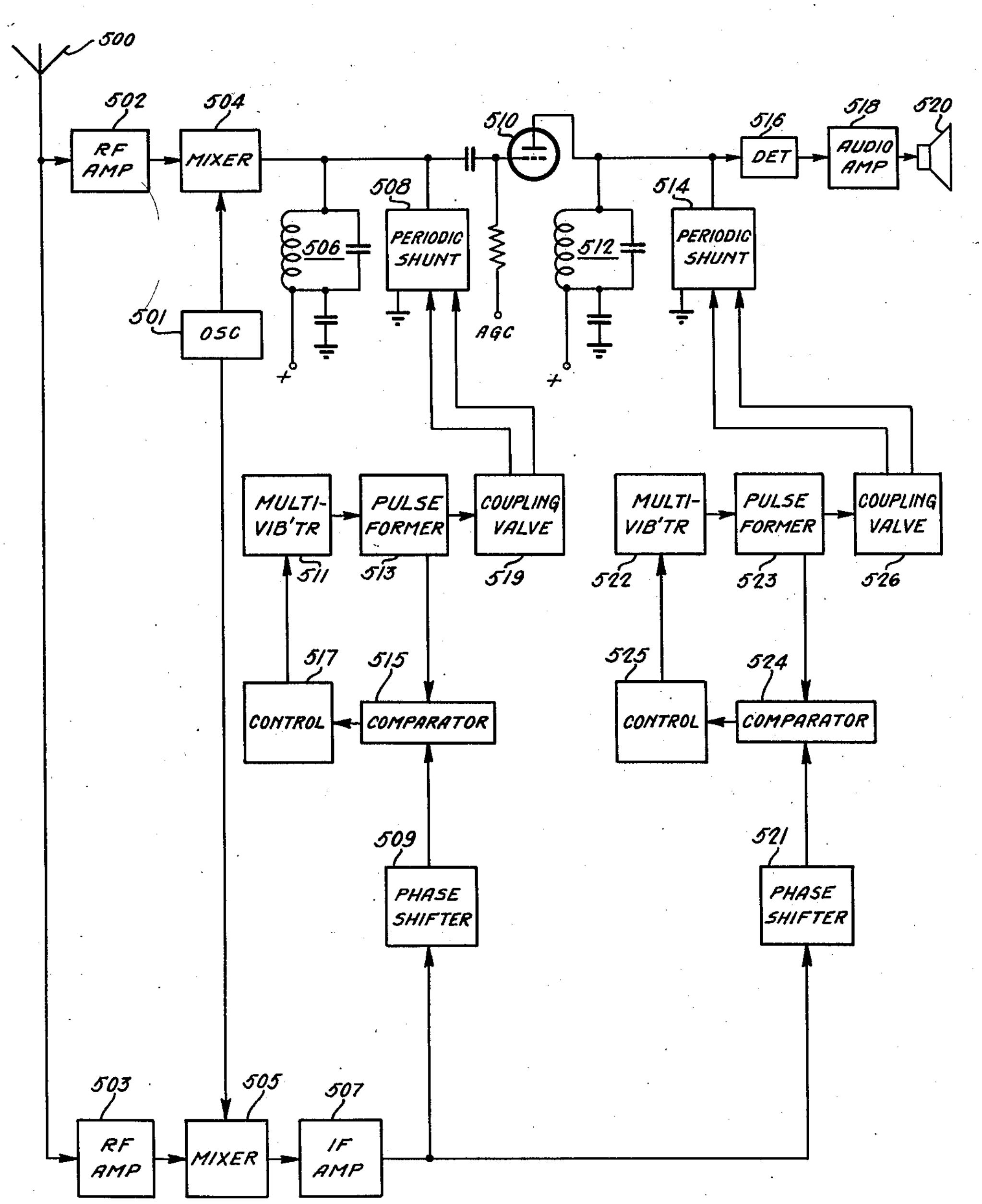

Figure 8 illustrates in block form a receiving system useful in conjunction with the transmitting arrangement of Figure 7, Figure 9 schematically illustrates a controllable energy absorbing network utilizing an electron beam, Figure 10 schematically illustrates an energy absorbing network utilizing unilateral conductors, Figure 11 graphically illustrates the relation between the observed envelope and the carrier phase position, Figure 12 illustrates the improved selectivity realized from cascading the described selective systems, Figure 13 illustrates in block form a receiver employing cascaded selective networks of the type described, and Figure 14 illustrates in block form a receiver employing cascaded selective networks of the type described in which one or more resonant circuits within such network may be detuned from the desired signal frequency.

Considering the simple circuit of Figure 1, now, it is seen to comprise in inductance 20 across which is shunted a capacitor 22 paralleled by a switch 24. Assuming the switch 24 to be open, the circuit is recognized as the familiar resonant circuit in which the frequency of resonance or maximum response is determined by the inductance and capacitance, and the relative magnitude of such response is determined by the "Q," or ratio of reactance to resistance at the resonance frequency. A winding 26 is loosely coupled with the inductance 20 and impresses signals derived from the antenna 28 thereon. The resultant voltage appearing across the circuit 20, 22 may be impressed on the control element of the conventional valve 30 and then fed into any further circuits desired for the utilization thereof.

Assume that we excite the circuit 20, 22 at its resonance frequency with the switch 24 open. There will be observed across this circuit a voltage waveform such as that observed at 32 in Figure 2. As is well known, the amplitude of the voltage appearing across the capacitor 22 is "Q" times the voltage which would be observed across the terminals of the coil 20 in the absence of such capacitor. In the ensuing discussion, it will be convenient to think of "Q" in terms of another definition, the ratio of stored energy to energy dissipated per cycle.

Let us now suppose that it is possible to operate the switch 24 at a very high rate of speed, such that it closes twice for each oscillatory cycle of the voltage illustrated and remains closed only momentarily. If these closures are spaced in time by $\pi$radians and occur at 0, $\pi$, $2\pi$, $3\pi$, etc., that is, only when the voltage across the capacitor 22, and consequently the energy stored therein, may be expected to be zero, it will not appear to the circuit that anything has changed, for if the switch is closed only at a voltage zero, no current flows therethrough and no energy is removed from the circuit. If the switching frequency is now maintained constant and a signal wave of another frequency, still close enough to resonance to be "magnified" by the effect of the circuit tuning, it is obvious that the voltage will not always be zero at the time the switch is closed and, when it is not, the stored energy in the capacitor 22 is dissipated, materially reducing the circuit magnification factor for such non-isochronous waves. For example, if it closes at a point on the interfering wave corresponding to an angular value of $/\pi/6$ ($\sin^{\pi}/6/=\frac{1}{2}$), then ¼ the stored energy is dissipated and the magnification factor is reduced to 2, since this action takes place twice each cycle. Now, the relative phase between the interfering wave and the switching action is subject to progressive variation, so that the attenuation suffered by such energy is subject to corresponding variation. When the switch closure occurs at the peak of the wave, all the stored energy is absorbed, whereas, when the capacitor is exposed to discharge at the voltage zeros, no continuous attenuation is to be noted. However, the voltage across a tuned circuit requires an appreciable time to build up or decay to its final value, so that, even though there are periods when the interfering wave is not exposed to supplemental energy loss, the time duration of these periods is sufficiently abbreviated that a substantial improvement in performance may be realized.

The envelope of the increasing voltage across a tuned circuit in response to the sudden application of exciting energy is of the form ($1-\exp-n\pi/\text{magnification}$). Considering that six degrees before the voltage zero is reached and six degrees after, the capacitor discharge consumes $\frac{1}{110}$ the stored energy, it is seen that for purposes of a rough estimate it may be assumed that the time required for a relative phase shift of twelve degrees is available for voltage buildup. Taking a relative frequency difference of 1%, it is found that the peak attained by the envelope is of the order of 70% of the value it would attain without benefit of such loading, reflecting an appreciable improvement in selectivity. The general shape of such an envelope, plotted for a frequency difference of 1% is shown at 34 in Figure 3.

It is, of course, impractical in the present stage of the art to produce capacitor discharge intervals which are infinitesimal in duration compared to the period of the signal wave. Brief consideration demonstrates that this does not prevent the realization of the advantages of the invention, for we are accustomed to dealing with circuits having appreciable losses and it is possible to avoid adding excessively to such losses with practical discharge times. The following table gives the proportion of energy dissipated for the indicated angular displacement between the time of capacitor discharge and the time of voltage zero:

| Angle | Ratio of Stored Energy to Energy Dissipated |
|---|---|
| 34′ | 10,000 |
| 1° 9′ | 2,500 |
| 1° 48′ | 1,000 |
| 2° 33′ | 500 |
| 3° 37′ | 250 |
| 5° 45′ | 100 |
| 8° 3′ | 50 |
| 19° 28′ | 10 |

It is considered undesirable to work with closure angles for the discharge circuit exceeding forty degrees (twenty degrees before and after the voltage zero) because of the low circuit magnification presented to the desired signal.

The frequency-transmission characteristic of such a circuit is shown in Figure 4, the curve 36 representing the selectivity characteristic of a conventional circuit of inductance and capacity resonating at 100 kcs., while the curve 36 represents the single signal selectivity characteristic of the same circuit with the periodic loading described herein based upon the ratio of the peak amplitude of the envelope 34 to the steady state voltage developed by a signal isochronous with the circuit resonant frequency and the switching frequency. It is of interest to consider whether, as in the case of the conventional circuit, the single signal selectivity characteristic of the circuit under description is the same as its composite signal selectivity characteristic.

It is well known that a carrier wave coupled with a pair of properly phase related waves symmetrically displaced in the frequency spectrum can also be represented as a wave of constant frequency varying in amplitude. Although such a wave varies in envelope amplitude, its voltage zeros do not change in position with modulation. Hence, once the capacitor discharge circuit is timed to place the discharge intervals substantially at the voltage zeros, there is no distinction between the modulated and unmodulated wave. This is to say that for an amplitude modulated wave in which both sidebands are present, the response of the periodically loaded circuit to the composite signal is given by the response curve of the basic circuit of inductance and capacity without auxiliary loading for the carrier and all symmetrically disposed sidebands. That this is not true for a signal in which one side band has been suppressed is evident from a consideration of the mathematical expression therefor, which reveals a shifting in the position of the axis intercepts. In the case of signals asymmetrically disposed in the frequency spectrum, the combination of functions required to place the voltage zeros always in coincidence with the zeros of the selected carrier does not exist. Essentially, therefore, the circuit described is vested with the unique property of responding without additional attenuation to the selected carrier and to signals symmetrically disposed in the frequency spectrum about that carrier and having the phase relations characteristic of double side band amplitude modulation, while presenting the far more selective characteristic of 38 to signals not possessed of this characteristic.

In the case of radio reception over long distances, it may often occur that the various components of the composite signal are subjected to different attenuations, whereby one sideband arrives at the receiving location with greater strength than the other. To the extent that the stronger sideband is without counterpart in the energy of the less strong sideband, the former will be attenuated, reestablishing the balance required for faithful reproduction.

The fact that a pair of signals, symmetrically displaced in phase and frequency from a reference carrier vector are functionally identical with a wave of the same frequency, but reversible phase is evident from Figure 5, in which the high frequency sideband is represented by 40, the low frequency sideband by 42, and the carrier vector by 44. So long as the sideband vectors lie in the first and fourth quadrant, the carrier is reinforced, and when they swing into the second and third quadrants, the carrier is opposed, thereby producing the variation in carrier intensity characteristic of amplitude modulation.

Reference is now made to Figure 6 for the schematic diagram of a receiving system embodying the principles of the invention. Signal energy intercepted by the antenna 46 is coupled into the secondary circuit of a radio frequency transformer 48, which may be tuned to the desired signal frequency by a capacitor 50. The resonant circuit is completed by the bypass capacitor 52 connected between the low potential end of the transformer secondary and ground. A resistor 56 provides a direct current grid return to a source of automatic gain control voltage. The signals appearing across the capacitor 50 may be impressed on the signal control grids of a pair of conventional mixer valves 54, 58, which are also provided with space charge electrodes maintained positive with respect to their associated cathodes, and oscillator control grids connected together and to the winding of the oscillator coil 60. The cathode of the valve 54 may be returned to ground through a bias resistor shunted by a capacitor, while the cathode of the valve 58 connects with a tap on the oscillator coil in the usual manner, to generate sustained oscillations in familiar fashion.

The anode 62 of the mixer 58 may be connected with a source of positive potential through a circuit including the paralleled capacitor 66 and inductance 68. For reasons which will later appear, it is desirable that the ratio of the resonant frequency to the "Q" of the input tuned circuit be greater than the ratio of the resonant frequency to the "Q" of the circuit in the anode circuit of the mixer.

The anode 70 of the shunt valve 72 and the anode 74 of the compensating valve 76 are also connected with the anode terminal of the tuned circuit 66, 68, and signals appearing thereacross are coupled to the control grid 80 of the amplifier valve 82 by capacitor 78. The valve 72 is caused to optionally appear as a controllable resistance with a comparatively low value by coupling the control grid 84 through capacitor 86 with the anode 70. A resistor 88, chosen of such magnitude as not to introduce appreciable phase shift and to load the tuned circuit 66, 68 negligibly, connects between the control grid 84 and a suitable source of bias potential. The space charge grid 90 of the valve 72 and 92 of the valve 76 may be returned to a suitable source of exciting potential, chosen for illustrative purposes to be 125 volts. The control grid 94 of each of the valves 72, 76 is provided respectively with an auxiliary control or suppressor grid 98, 100, connected by the lines 99, 101 with a source of switching control potentials to be later described. The voltages developed across the tuned circuit 66, 68 are coupled to the control grid 80 of the conventional amplifier valve 82, which, through the intermediate frequency transformer, drives the diode rectifier 87 to produce demodulated signal voltages across the diode load 102. This load comprises the resistance element of a potentiometer, whose movable tap is connected with the audio amplifier 104, coupled to an output device, such as the loudspeaker 106.

The switching control potentials are basically derived from the operation of a multivibrator 108, including the valves 110 and 116, illustrated here as triodes. The anode 112 of the valve 110 is coupled through the compensated load 114 to the supply bus 125, maintained as a positive potential of 125 volts with respect to ground, the anode 118 of the valve 116 being similarly coupled through the compensated load 120. The magnitude of the series peaking inductance in the compensated loads may be determined in accordance with the usual rules governing the design of extended range amplifiers.

The anode 118 of the valve 116 may be coupled through the capacitor 122 to the control grid 126 of the valve 110, the grid return being provided by the connection of a resistor 134 to the movable tap on the potentiometer 138 bridged between ground and plus 125 volts. The tap of the potentiometer 138 may be grounded for high frequency currents by capacitor 140. In like manner, the anode 112 of the valve 110 may be coupled through the capacitor 124 with the control grid 128 of the valve 116, whose grid return is provided by the resistor 136 connected with the movable tap on the potentiometer 142, bypassed to ground through capacitor 144. The cathodes 130 and 132 of the valves 110 and 116 are connected with ground through resistor 150 paralleled by capacitor 152. This circuit may have a relatively long time constant, such as 0.1 second to smooth out control action on the multivibrator frequency.

A diode 154 has its cathode connected with the control grid 126, and another diode 156 has its cathode connected with the control grid 128, the anodes of said diodes being connected together and to one end of the resistor 146, having its other end connected with the movable tap of potentiometer 148 bridged between ground and minus 50 volts. In addition, the tap of the potentiometer 148 may be connected with ground through a bypass capacitor 158.

Signals passing through the diodes 154 and 156 are coupled through the capacitor 160 with a single shot multivibrator or delay flop 168, acting as a pulse former, to develop impulses with a repetition rate determined by the multivibrator 108 and a duration determined by the constants of the delay flop circuits. For the purposes of illustration, it may be assumed that the operating frequency of the multivibrator is 100 kcs., and that the delay flop delivers pulses with a length of the order of 0.2 microseconds.

The delay flop 168 may include a valve 172 having an anode 174 connected with the supply bus 125 through the compensated load 170 and coupled by a capacitor 184 with the control grid 182 of a companion valve 164. The anode 162 of the valve 164 is also coupled with the supply bus 125 through a compensated load 166, and is connected with control grid 176 of the valve 172 through capacitor 190 and resistor 188, said resistor being shunted by a speed-up capacitor 186. The cathodes 178 and 180 of the valves 164 and 172 are connected with ground, and the grid 182 is connected with a source of negative bias potential through resistor 192. The magnitude of the bias normally supplied to the control grid 182 is such as to maintain this valve normally nonconductive. On the other hand, the control grid 176 of the valve 172 is connected through resistor 194 with the movable tap of a potentiometer 196 bridged between the supply bus 125 and ground, so that the valve 172 is normally maintained in a conductive state.

The anode 162 of the valve 164 is further connected with the control grid 202 of the coupling valve 204 by a capacitor 200, the grid end of the capacitor being returned to ground through a resistor 218. The anode 208 of the coupling valve 204 may be connected with a source of anode voltage through the compensated load 210, while its cathode 206 may be connected with ground through a similar compensated load 214. The control line 99 is energized from the anode 208 of the coupling valve 204 through the coupling capacitor 212, and is connected through the resistor 217 with the movable tap of the potentiometer 220, grounded for high frequency currents by capacitor 222. Similarly, control line 101 is energized from the cathode 206 of the coupling valve 204 through the coupling capacitor 216, and connected with the movable tap of the potentiometer 226 through resistor 224, whose tap end is further linked with ground through the bypass capacitor 228.

Signals appearing at the anode 208 of the coupling valve 204 are coupled through capacitor 230 to the auxiliary control grid 232 of the control gate valve 234, the grid return for this grid being provided by resistor 268 connected to a source of potential normally maintaining this valve cut off. The space charge grid 244 of the valve 234 may be excited from a plus 125 volt bus, while the anode 238 may be connected with an anode source through the load resistor 240 compensated or uncompensated. Reference signals may be applied to the control grid 236 of the valve 234 from the phase shifter 262 through the capacitor 264. A nominal negative bias potential may be applied to the control grid 236 through the grid resistor 266. The reference signals may be obtained by connecting a highly selective intermediate frequency amplifier 260 with the anode 64 of the mixer valve 54, and applying the output of this amplifier to the phase shifter 262. It is permissible to use any of the well known methods of enhancing the selectivity of the amplifier 260, for it is not required that this amplifier pass intelligence controlled frequencies, but merely energy at the carrier frequency for reference purposes.

The anode 238 of the valve 234 is further coupled with the control grid 252 of a control valve 254 by a coupling capacitor 246, a diode 248 being also connected between grid 252 and ground, with its cathode connected with the control grid 252 and its anode connected with ground. A resistor connected in parallel therewith provides a direct current return path. The anode 256 of the control valve 254 may be connected with the supply bus 125, and its cathode 258 is connected with the ungrounded end of resistor 150.

It is to be understood, in this and the remaining figures, that the usual heaters may be associated with thermionic cathodes, as required, such heaters and energizing circuits therefore having been omitted from the illustrations in the interest of clarity, their general nature being well known. The required direct current operating potentials for exciting the balance of the elements of the valves may be derived from any suitable power supply connected with a voltage dividing network, such as that illustrated at 280.

The circuit of Figure 6 functions in relatively straightforward manner, the signals from the antenna 46 being applied to the transformer 48, which is tuned to resonance with the desired signal by adjustment of the capacitor 50. The mixer valve 58 generates sustained oscillations in the oscillator coil 60, whose frequency may be adjusted by variation of the adjustable capacitor 61 connected with the said coil 60. The tuning capacitors 50 and 61 may be mechanically coupled for simultaneous variation and so designed that the difference between the selected signal frequency and the frequency of the locally generated oscillations is constant, and equal to the selected intermediate frequency, as is customary in superheterodyne receivers. The interaction within the mixer valves 54, 58 of the locally generated oscillations and the signals derived from the antenna 46 produces corresponding new signals at the sum and difference frequencies, one of which may be selected for further amplification and demodulation. For convenience the selected signal will be referred to as the intermediate frequency signal.

The output of the mixer 54 is impressed on the control channel intermediate frequency amplifier 260, designed to pass essentially only a single frequency, using as many of the available expedients for enhancing its frequency discriminating properties as required and generally indicated by the balance of performance and economic factors. This high degree of selectivity is permissible, as the control channel including the amplifier 260 is not required to handle intelligence frequencies, but need pass only the carrier itself, for synchronizing purposes. From the output of the amplifier 260, the energy of the selected frequency is fed into the phase shifter 262, of which there are many types available, delivering it to the synchronizing circuits whose functions will be later described. The phase shifter 262 is adjusted for minimum loss of the desired signal in the signal channel.

The tuned signal circuit 66, 68 in the anode circuit of the mixer valve 58 is excited by the beat frequency energy to which it is tuned. For the purpose of the initial explanation, it may be assumed that the selected beat and the free oscillation frequency of the circuit 66, 68 are isochronous. The amplified voltage appearing thereacross is further amplified by the valve 82 and demodulated by the diode 87. Demodulation and work circuits suitable for use with modulation frequencies in the audio frequency range have been shown in the illustrated embodiment of the invention, it being obvious that these new principles may be applied with advantage in configurations characteristic of any other range of modulation frequencies. The demodulated signals across the potentiometer 102 are applied to an amplifier 104 and load device represented by the speaker 106.

In addition to these conventional signal circuits, the shunt valve 71 and compensating valve 76 are also connected across the circuit 66, 68 in the manner already described. The valve 72 is normally maintained in substantially inoperative condition, while the bias potentials applied to the valve 76 are such that it normally passes anode current.. However, the valve 76 is of a multiple electrode type, such as a 6AS6, presenting a very high A. C. anode impedance, so that it loads the circuit 66, 68 only negligibly, despite its normally operative condition. Control signals applied to the valves 72, 76 periodically change the impedance across the circuit 66, 68.

These control signals derive initially from the multivibrator 108, of conventional structure. The free running frequency of the multivibrator 108 and time division between the two valves 110, 116 thereof, are controlled by adjustment of the tap position on potentiometers 138 and 142. Moving either tap toward the more positive potentiometer terminal increases the free running frequency by decreasing the time during which the associated valve remains in the nonconductive state. These potentiometers are preferably adjusted so that the transitions of state between the two multivibrator valves occur $\pi$ radians apart, referred to the signal wave to be selected, although the advantages of the invention may also be enjoyed if the transitions occur more than $\pi$ radians apart, so long as the spacing of the transitions approximates an integral multiple of $\pi$. Such greater spacing, however, diminishes the degree of improvement in selectivity which may be attained. Separation by less than $\pi$ radians again reduces the selectivity improvement. Variation in the current flowing through resistor 150 changes the free running frequency without affecting the time division. This effect is used to control the multivibrator 108 from the control signal channel.

Each time the anode 118 of the valve 116 suffers a negative excursion, the signal transferred through the capacitor 122 drives the control grid 126 of the valve 110 to cut-off and initiates conduction through the coupling diode 154 which transmits the signal to the diode end of the resistor 146. Adjustment of the tap on potentiometer 148 determines the amount of negative excursion required to initiate signal transfer, through its fixing of a threshold voltage required for conduction. The diode 156 transfers signals from the control grid 128 to the diode end of resistor 146 in like fashion.

The use of the diodes 154, 156 grows out of a number of considerations. Primary among these is the fact that the transition time of the negative anode excursion of the multivibrator valves is much less than the transition time involved in the positive excursion. It is, therefore, desirable to use the negative stroke. For best results, it is desirable that the transfer of operation between the shunt valve 72 and the compensating valve 76 occur every $\pi$ radians at the signal frequency. Use of the negative stroke from a single side of the multivibrator would require, if this condition were to be satisfied, that the multivibrator operate at twice the signal frequency. As the frequencies which would be involved in this instance are attainable in a multivibrator only with the exercise of considerable care and skill in design and fabrication, it is convenient to simplify the problem by interposing the diodes referred to, whereby two negative strokes per operating cycle are available. The use of two diodes is required by the need for isolating the two circuits, and the adjustable threshold afforded by the potentiometer 148 eliminates the effects of minor transients.

The capacitor 160 is small enough to perform a differentiating action on the signal delivered by the diodes 154, 156, which is applied to the anode 162 of the normally nonconducting valve 164 in the pulse former 168. The negative impulse triggers a process initiating the transfer of conduction from the valve 172 to the valve 164, where it remains until discharge of the capacitor 190. The time required for this discharge, and consequently the length of the triggered impulse, may be regulated by adjustment of the potentiometer 196. When the capacitor 190 has discharged sufficiently, conduction through the valve 172 is resumed, while that through the valve 164 is cut off. As already mentioned, the length of this interval may be about 0.2 microsecond, when operating with a signal channel intermediate frequency of 100 kcs. This represents an angle of somewhat over seven degrees at the signal channel frequency. Reference has already been made to the tendency of the positive stroke of the anode excursion in a multivibrator to have a less steep rise than the negative stroke. The reason for this is twofold. First is the fact that, during the negative stroke, the valve anode resistance is in parallel with the load impedance, providing minimum time constant and thereby improving the speed of circuit response. Second is the consideration that, during the positive stroke, the grid of the valve which is being driven into the conductive state becomes positive and also conducts, whereby the grid coupling capacitance is effectively connected across the anode circuit of the valve being driven into the nonconductive state. This slows up the rise of the anode voltage to its rest value. Capacitor 186 and resistor 188 are interposed in the coupling link between the anode 162 of the valve 164 and the grid 176 of the valve 172 to minimize this effect. The resistor 188 is large with respect to the conductive impedance of the control grid 176 when it is positive, and the capacitor 186 is quite small, passing only the initial surge occurring at the anode 162. It is comparable with the control grid input capacitance. This permits the flow of grid current which would otherwise effectively connect the capacitor 190 between the anode 162 and ground, thereby speeding up the positive-going voltage rise.

The negative surge appearing at the anode 162 is impressed on the control grid 202 of the coupling valve 204, to produce a negative-going impulse of corresponding duration on the line 101 and a positive-going impulse of like duration on the line 99. The positive impulse on line 99 permits conduction through the shunt valve 72, while the negative-going impulse on line 101 interrupts conduction through the compensating valve 76. The potentiometers 220 and 226 are so adjusted that, in the absence of signal across the circuit 66, 68, the current drawn by the valve 72 during conduction is essentially equal to that normally drawn by the valve 76, whereby the injection of new voltages into the signal circuit 66, 68 is avoided, since a constant current flows therethrough, only the path varying between the shunt valve 72 and compensating valve 76. If the switching impulses on the lines 99 and 101 are properly synchronized with the desired signal stimuli, the shunt valve will be active only when the voltage across the elements 66, 68 is passing through zero, and the circuit reacts in the manner of a normal inductance-capacitance combination. If the voltage at anode 62 is positive of its reference value, this is coupled through capacitor 86 to the control grid 84 of the shunt valve 72 and increases the current drawn by this valve during its active period. Conversely, if the voltage at anode 62 is negative of its reference value, this is coupled through capacitor 86 to the control grid 84 to decrease the anode current. This is the equivalent of connecting a resistor of value $1/G_m$ across the combination 66, 68 during the positive excursion of the line 99.

The presence of the compensating valve 76 maintains the continuity of current flow through the circuit 66, 68 and avoids introducing disturbing signals into the signal channel. Since, in the example described, the switching action occurs twice per signal cycle, such a disturbance would have a frequency double the signal frequency, and might be eliminated by the action of succeeding tuned circuits. However, even in this event, the task of eliminating the disturbance is simplified by minimizing its initial magnitude through the use of the compensatng valve. Greater spacings of the switching action make the use of a compensating valve even more desirable.

Because the frequency-transmission characteristic of the circuit is dependent upon the phase relation between the control waveforms appearing in the output of the coupling valve 204 and the selected signal energy, either highly stable transmitting and local oscillators must be employed, or the transmitted frequency must be used to govern the operation of the source of control potentials. The latter expedient has been applied in the illustrative embodiment.

The valve 234 is employed as a control gate, with its control grid 236 excited from the output of the phase shifter 262 in the control signal channel. Each time the auxiliary grid 232 is driven positive during the actuation of the shunt valve 72, an anode current pulse is passed by the valve 234, whose magnitude is controlled by the phase relation between the control channel signal and the output of the coupling valve 204. The corresponding negative-going anode voltage excursion is coupled through capacitor 264 to the diode 248 which passes it to ground, charging the capacitor 264, whereby the average potential applied to the grid 242 of the valve 254 is made positive an amount depending upon the peak negative excursion. An increase in the peak negative voltage excursion increases the flow of current through the resistor 150, tending to cause the frequency of the multivibrator to decrease and re-establish the proper frequency and phase relationship to the control signal and conversely. The synchronizing and control action is related to the positive slope portion of the control signal delivered from the phase shifter 262. Hence the control action of the system illustrated in detail is limited to arrangements in which the periodic shunting action occurs at a frequency which is equal to, or an integral submultiple of, the signal frequency to be accepted. Obvious circuit modifications extend the utility of the control arrangement to other relationships between the periodic shunt frequency and signal frequency to be accepted, as for example, the excitation of the grid 232 of the gating valve 234 from one of the anodes or grids in the multivibrator 108.

Energy at the desired incoming frequency produces a periodic wave across the circuit 66, 68 whose voltage zeros coincide substantially with the time intervals during which the shunt valve 72 is actuated, and so pass on in the normal manner. Energy at other frequencies produces across the circuit 66, 68 a voltage wave which will not, in general, have a zero value at the time the shunt valve 72 is actuated, whereby a substantial portion of the energy stored in the oscillating circuit is dissipated, to reduce the circuit response to such undesired disturbances. The net result is a considerable improvement in discrimination against signals whose frequency components are asymmetrically disposed about the acceptance frequency of the system, while signals having a symmetrical composition, as produced in the amplitude modulation of a carrier wave, pass without attenuation beyond that inherent in the elements 66, 68.

In the foregoing discussion, it was assumed that the control signal frequency and the frequency of free oscillation of the combination 66, 68 were the same. Consider now the response of the system to a transient impulse, such as a step function. If this step function arrives at a voltage zero, the resultant transient due to ringing of the circuit 66, 68 is in phase with the desired signal and suffers no attenuation beyond that experienced from the circuit losses. If the circuit Q be 100, the transient will have died away to $1/e$ of its initial value in about 32 cycles. If the step function arrives at a voltage peak, the transient is completely dissipated at the time of the next shunting connection. Thus, an improvement in signal-to-noise ratio may be expected in the case where the switching signal and free oscillation frequencies are the same. If the free oscillation frequency and the signal are different, say, by $\frac{1}{10}$ of one percent, then the step function arriving at the signal zero suffers additional loss at each switching connection. With a signal circuit Q of 100, the amplitude of the transient will be reduced to $1/e$ of initial value in about 16 cycles. Transients caused by step functions arriving at $$\frac{\pi}{2}, \frac{3\pi}{2}, \text{etc.}$$

continue to be destroyed during the first shunting cycle. The result is a further improvement in signal-to-noise ratio.

Further consideration of the properties of the circuit described suggests interesting possibilities for the transmission of more than one independent train of information over a single carrier frequency without expansion of the band requirements. Energy at the acceptance frequency may be transmitted or dissipated, according to its phase with respect to the periods of activation of the shunt valve 72. If the voltage peaks which would be produced are positioned in time at the active shunting intervals, the build-up of stored energy by which selective circuits enhance or magnify the desired signal is prevented, and the voltage of such signal will not be significantly more than 1/Q of the voltage level attained in the absence of such action. On the other hand, simultaneously present energy at the same frequency, so phased that the zeros of the voltage wave produced thereby fall at the active shunting intervals, experiences no such attenuation and builds up to the usual enhanced level without interference. Two such carriers at the acceptance frequency may be independently modulated with different program material, and one or the other selected at the receiving location without material interference from the other. If tuned circuits having a Q of 100 are employed, the relative discrimination between the two signals, sent over the same transmission channel and occupying the same band spectrum, can well be of the order of 40 db. Higher Q circuits provide correspondingly greater discriminating ability.

A transmitting system radiating a signal of the required type for the transmission of different program material on the same carrier frequency within the same frequency spectrum is illustrated in block form in Figure 7, the details of the block elements being sufficiently familiar to those skilled in the art to obviate the necessity for detailed description of their internal configuration. A common radio frequency source 270 may be employed, a part of its output being impressed on the amplifier valve 278 through the phase shifter 274. Another portion of the output of the source 270 is applied to the valve 277 through the phase shifter 272. The anode circuit of the valve 277 includes the tuned circuit 281 and the secondary of the modulation transformer 275 supplied with program material from a first source. The tuning of the circuit 281 is adjusted in the conventional manner, and the signal potentials applied to the transformer 275 amplitude modulate the output of the valve 277 in well known fashion.

Similarly, the anode circuit of the valve 278 includes the tuned output circuit 280 and the secondary of the modulation transformer 276 excited by signals from a second program source, whereby an amplitude modulated carrier wave appears in the circuit 280. In each case, the secondary of the modulation transformer is shunted by a suitable radio frequency bypass capacitor.

The signals in the circuits 281 and 280 are coupled to and radiated from the common antenna 279.

The only critical requirement in this transmitting system is that the respective carrier functions associated with the individual programs are orthogonally related, which is to say that the carriers are substantially ninety degrees out of phase with each other. In the illustration of Figure 7, this may be attained by proper adjustment of the phase shifters 272 and 274, for example, exciting the valve 277 45° leading and the valve 278 45° lagging. The same result may be achieved, though with somewhat lesser convenience, by exciting the amplifiers 277 and 278 directly from the source 270 and appropriately detuning the respective tuned output circuits 280 and 281. As another expedient, independent synchronously controlled radio frequency sources might be used. These details are not material, so long as two carrier disposed in quadrature relationships are employed.

Radiation of the two signals from a common radiator is desirable if the effects of varying path lengths are to be avoided. Independent radiators are acceptable, however, where the spacing is held within limits meeting the operational requirements, or where the signal separation is intended to be available along one or more selected paths.

The signals radiated from the system just described may be separately utilized in the receiver of Figure 8. This receiver consists of two systems generally similar to that of Figure 6, modified by the insertion of an additional tuned radio frequency selector stage ahead of that in the signal input circuit of the mixer. This modification is not essential but represents a conventional method of improving the image frequency rejection. The output of the tuned radio frequency amplifier 301 is impressed on the mixer 302 in the first signal channel, this and the balance of the mixers being supplied with local oscillations from the local oscillator 303 providing a periodic wave having a frequency separated from the incoming signal by the desired intermediate frequency.

The output of the mixer 302 at the desired intermediate frequency is impressed on a resonant circuit, having its maximum response near the said intermediate frequency, incorporated in one of the block elements, and delivered therefrom to the intermediate frequency amplifier 304, which amplifies the signal and impresses it on the demodulator 306, whose output excites the modulation frequency amplifier 308 driving the load device 310. The shunt 312 and (if it is used) compensator 314 operate on the resonant circuit in the manner described above.

The second signal channel includes the mixer 305 receiving stimuli from the output of the tuned radio frequency amplifier 301 and local oscillator 303, having its output connected with the intermediate frequency amplifier 307 via a link including a resonant circuit as above described. The output of the intermediate frequency amplifier 307 drives the detector 309, which separates and impresses the modulation intelligence on the modulation frequency amplifier 311 connected with the load device 313. The tuned circuit in the second signal channel may be acted upon by the shunt 315 and compensator 317, as above described.

A third mixer 320, connected with the local oscillator 303 and tuned radio frequency amplifier 319, is situated in the control channel and connected with the highly selective intermediate frequency amplifier 321 coupled to the phase shifters 322 and 323. The phase shifter 323 is associated with the control apparatus governing the shunt 312 and compensator 314 in the first signal channel and delivers its output to a comparator 331. The comparator 331 is operatively linked with a multivibrator 325 through a time delayed control device 333 governing the frequency and/or phase of the multivibrator action under the control of the signals derived from the output of the phase shifter 323 and compared with the output of the pulse former 327. In addition, the pulse former 327 also drives the coupler 329 governing the operation of the shunt 312 and comparator 314.

The shunt 315 and compensator 317 in the second signal channel are governed by the multivibrator 324, exciting the pulse former 326 and the coupler 328. A portion of the output from the pulse former 326 is also impressed on the comparator 330, where it combines with the output of the phase shifter 322 to provide a control signal, operating through the time delayed control device 332 to properly relate the phase and/or frequency of the multivibrator output to the control channel signals and, thereby, the second signal channel signal as well.

The correspondence between the block configuration of Figure 8 and the detailed diagrams of Figure 6 is so obvious that there is no need for the presentation of a complete schematic diagram showing every element. Corresponding elements of Figure 6 may be combined in accordance with the block outline of Figure 8.

Each of the signal channels operates in substantially the same fashion as indicated in the previous discussion, the phasing of the operation of the shunt circuit in the signal channels serving to present high transmission loss to the undesired signal which would give rise to a voltage wave having its peak coinciding with the interval when the associated shunt presents a low resistance to the associated tuned circuit.

Assuming that the transmitter radiating the signals to be picked up and demodulated by the receiver of Figure 8 is characterized by carriers of equal intensity and that the tuned circuits in the output circuits of the mixers 302, 305 resonate at the selected intermediate frequency, the overall phase shift to the comparator for one of the signal channels should be about forty-five degrees leading, and that in the other of the signal channels should be about forty-five degrees leading. Detuning, and the consequent phase shift in the mixer output circuits, will change this relationship by amounts corresponding to the phase shift occurring in the particular mixer output circuit. The difference in phase shifts, expressed in terms of degrees between the signal voltages and the phase of the shunt operation will, however, always be ninety degrees for best discrimination between the two sets of program material.

Another acceptable approach to the problem of insuring proper relative phase shifts would use a single controlled multivibrator, and secure the desired phase shift by relative phase displacement of the voltages applied to the mixers 302, 305. This principle may be put in practice by connecting phase shifters in one or both the lines connecting the oscillator 303 with the mixers 302, 305, or by a similar arrangement at the radio frequency level. The complete flexibility with which the desired phase shifts may be attained, is apparent from the foregoing examples.

While the difference between the phase of the switching intercepts on the signal wave will always be ninety degrees or an odd integral multiple thereof for best discrimination between the first and second programs radiated from the transmitter of Figure 7, a difference in carrier magnitudes requires corresponding adjustment of the individual phase displacements, referred to the control channel. For example, in the case already assumed of equal carrier amplitudes, one will lead forty-five degrees, while the other lags forty-five degrees. If one carrier amplitude be five times the other, one will lead (or lag) 78° 41′, while the other lags (or leads) 11° 19′, the angles being derived from arc tan $carrier_1/carrier_2$. The derivation for other cases is obvious.

The system of Figures 7 and 8 may be utilized with advantage for stereophonic acoustic reproduction in which independent transmission of acoustic signals picked up at separate points is desired. Where reduction in band width is the goal, as in the transmission of visual information, a low pass filter may be used to select a first portion of the program spectrum which is then impressed on a first channel as modulation, the balance of the modulation spectrum being separated by a high pass or band pass filter and transposed downward in the frequency spectrum before being broadcast over the second channel. The process in the second channel is reversed at the receiving location and the signal obtained recombined with the output of the first channel to reproduce the original input.

It is only important that the carriers be displaced by ninety degrees if simultaneous reproduction of the material in both channels without substantial mutual interference is sought. Other mutual phase displacements and more than two carriers may be used, if it is only required that one set of program material at a time be made available without excessive interference. Three carriers, mutually spaced forty-five degrees, permit the simultaneous radiation of three sets of program information at a time, any one of which can be selected with a discriminating ratio of 50:1 over the undesired channels in circuits having a Q of 100, and correspondingly improved discriminating ratios in circuits having higher Q.

It appears next in order to discuss alternative shunting arrangements, particularly arrangements of this type not requiring compensatory circuits. The only limitation on such alternatives is that they must, with the shunt capacitance, have a time constant of the order of the active shunting interval, preferably less. A deflection type valve having the necessary characteristics is shown in Figure 9, wherein the circuit 66, 68 is connected with a valve comprising an electron gun made up of cathode 346, intensity control electrode 347, focusing electrode 348 and second anode 349 mounted in one end of the evacuated envelope 342. When the proper potentials are applied to these electrodes, they project an electron beam past the deflecting plate pair 343, 344 to the end of the envelope housing the spaced target electrodes 340, 341. The electrodes 341 and 343 are connected with the other side of the circuit 66, 68. The target electrodes 340, 341 are so spaced that, in the absence of potential across the deflecting electrodes 343, 344, the electron beam 345 falls equally on both target electrodes or falls between them, substantially filling the space between the target electrodes. The second anode 349 may be connected with ground, while the focusing electrode 348 is connected with an adjustable tap on the voltage divider 350 bridged between ground and a source of highly negative potential. Another tap of said voltage divider 350 is connected with the cathode 346, while the beam intensity electrode 347 is linked through resistor 351 to the negative end of the voltage divider 350. The cathode tap is adjusted to impress on the intensity control electrode 347 a potential normally preventing the emission of electrons from the cathode 346 to develop the beam 345.

A capacitor 352 connects the intensity control electrode 347 with a source of positive-going impulses such as the coupler valve 204 in Figure 6. Upon the arrival of a positive-going impulse at the intensity control electrode 347, the beam 345 is established. If the voltage across the circuit 66, 68 is zero at this instant, the beam either fails to touch either of the two target electrodes, or impinges on them equally, whereby no load is presented to the circuit 66, 68 and no transient voltages are induced therein. If, however, the target electrode 341 and deflecting electrode 343 are relatively positive, the electron beam is deflected to impinge to a greater degree on the target electrode 341, effectively drawing current from the corresponding terminal of the circuit 66, 68 and loading it an amount dependent upon the beam current and beam deflection. A relatively negative potential on the target electrode 341 and deflecting electrode 343 gives rise to the reverse effect, corresponding to the current flow that would take place through a loading resistor in the presence of such reversed polarity.

If the desired balance of beam current interception by the target electrodes 340, 341 does not normally exist in the structure of the valve of Figure 9, the beam may be deflected to a suitable extent, using an external magnetic field, or superimposing the necessary deflecting potentials on the deflecting electrodes 343, 344 in circuits of conventional form. When beam current is properly balanced between the target electrodes, this arrangement is free of the requirement for a compensating valve and permits some simplification of the foregoing configurations.

Another circuit possessed of these advantages is revealed in Figure 10. In this arrangement, the coil 68 is centertapped and connected with ground, and the adjustable tuning capacitor 66 connected thereacross in the usual manner. A first pair of diodes 360, 361 is connected in series opposition across the leads to capacitor 66 with their anodes connected together, and a second pair of diodes 362, 363 is similarly connected in opposition with their cathodes connected together across the capacitor leads.

The junction of the diodes 360, 361 is connected with the cathode end of the resistor 364 situated between the cathode 365 of the valve 366 and a supply conductor maintained at a negative potential of approximately 10 volts. The valve 366 is further provided with a control grid 367 returned to ground through the grid leak resistor 368. The ungrounded end of the resistor 368 may be connected through a capacitor 369 with a source of positive-going impulses, such as the pulse former or coupler valve 204 of Figure 6. The anode 370 of the valve 366 is connected with a source of anode potential through the compensated load 371 and to the control grid 372 of the valve 373 through the capacitor 374. The anode 375 of the valve 373 may be connected directly to a source of anode potential, while its cathode 376 is returned through the cathode resistor 377 to a supply conductor having a negative potential of approximately ten volts. The cathode end of the resistor 377 is connected with the junction of the diodes 362, 363, and, through resistor 378 with the control grid 372 of the valve 373.

Neglecting, for the moment, the signal voltages which may appear in the circuit 66, 68, it is apparent that the valve 366 is normally nonconductive, while the valve 373 is normally conductive. The anodes of the diodes 360, 361 are therefore negative with respect to their associated cathodes and the cathodes of the diodes 362, 363 are positive with respect to their associated anodes, whereby neither of the diode combinations loads the circuits 66, 68 appreciably, since these potentials render them nonconductive. With the arrival of a positive-going impulse at the input of the valve 366, conduction is initiated which makes the cathode end of the resistor 364 positive with respect to ground and conditions the diodes 360, 361 for conduction. At the same time, the current surge flowing in the anode circuit produces across the compensated load 371 a negative-going impulse transmitted through the capacitor 374 to the control grid 372 of the valve 373, whose anode current is cut off, permitting the cathode end of the resistor 377 to become negative and condition the diodes 362, 363 for conduction. If the voltage across the capacitor 66 is passing through a zero at this instant, the operation of the circuit is undisturbed. If, however, the voltage across the capacitor 66 differs appreciably from zero, an unbalance current will flow through the diode, producing a loading equivalent to the connection of twice the forward resistance of the diodes across the capacitor 66 during the interval that the valve 366 is maintained conductive and the valve 373 is nonconductive. Two pairs of diodes have been employed to permit loading the circuit during both the positive and negative cycles. If it is desired to dispense with loading in one of these senses, it is permissible to employ a single set of diodes.

The output from the circuits 66, 68 is applied in the conventional manner to a pair of push-pull connected valves 378, 379 which may be then connected with any further apparatus desired. In this arrangement, of course, it is required that the signal potentials be low by comparison with the switching voltages delivered by the valves 366 and 373.

While the selectivity curve 38 of Figure 4 represents a material improvement over the conventional response characteristic illustrated at 36 in that figure, it has been found that the unusual properties of this method of enhancing circuit selectivity also permit unusual improvements in the selectivity attainable. This is achieved through the use of groups of such circuits. In the following it is to be particularly borne in mind that the selectivity characteristic 38 illustrated in Figure 4 is given by taking the ratio of the peaks of the output as represented at 34 in Figure 3 to the steady state output at the desired signal frequency. Broadly speaking, the selectivity curve 38 may be regarded as the poorest member of a family of selectivity curves, each existing during a particular instant in time. This is because the selectivity ratio changes continually during the operating cycle, being very high at the time when the envelope 34 is at its trough or minimum value and being relatively lower when the envelope 34 has attained its peak value. When the incoming signal differs in frequency from $$\frac{n}{2}$$

times the frequency with which the shunt circuit is actuated (where "$n$" is any integer), progressive slippage in relative phase position is observed, which gives rise to the output phase envelope shown at 34 in Figure 11, with maximum attenuation occurring when the shunting periods coincide with a voltage peak across the capacitor and minimum attenuation occurring somewhat after coincidence of the voltage zero with the activation of the shunting circuit. A change in the phase of the undesired signal effects a displacement of the troughs expressed on an absolute time scale. The cascading of selective circuits of the type described herein utilizes this effect to obtain an enhanced selectivity characteristic which is not a product of the selectivity characteristics of the cascaded circuits, in the mathematical sense, but which is, rather, the unique result of the time-staggering of the selectivity characteristics.

This will be best understood after consideration of Figure 11 in which the output envelope 34 appears on a reference grid. It will be recollected that this is the output which is derived from a circuit of the type described when the impressed frequency and the frequency of actuation of the shunting circuits are non-isochronous. The characteristic 400 in Figure 11 illustrates the time variation of the modulation of the envelope amplitude if a wave of the same frequency but displaced in phase by ninety degrees is impressed on a circuit of the type described in which the time of the shunt actuation is the same as that producing wave of 34. If it now be required that the output of 34 pass through the circuit giving rise to the envelope 400, the envelope of the resultant wave is of the nature illustrated at 402, that is to say, the peak amplitude of the envelope has been greatly reduced.

It is possible, in a manner to be later described, to require incoming signals to run this double gauntlet giving rise to the new selectivity characteristic 404 illustrated in Figure 12, representing, not the square of the characteristic 38, as in the case of conventional circuits, but a new function based on the foregoing phenomena.

A typical arrangement for attaining the benefits following on the time-staggering of the transmission minima is illustrated in block form in Figure 13, the block notation being employed, as the nature and interconnection of the block elements is apparent when the figure is considered in connection with Figures 6, 9, and 10. The antenna 406 is connected through the tuned radio frequency amplifier 408 to the mixer stage 410 and, through radio frequency amplifier 409, with the mixer 411 in the control signal channel. An oscillator 405 also excites the mixer 410, and through the phase shifter 407, the mixer 411. The output of the mixer 410 is impressed on the resonant circuit 412, having a reasonably high Q, across which there is connected a periodic shunt 414. In circuits where, as here, more than one tuned circuit is present in the signal channel before the signal is delivered to the periodically shunted resonant circuit, it is desirable that the sum of the decrements of the preceding tuned circuits not be greater than the decrement of the periodically shunted tuned circuit. In the present instance, this requires that the sum of the decrement of the tuned circuit in the radio frequency amplifier 408 and of the decrement of the tuned circuit in the input to the mixer stage 504 be not greater than the decrement of the circuit 506. The signals appearing in the circuit 412 are impressed on the amplifier valve 416 in whose output there is situated a further resonant circuit 418 operatively associated with periodic shunt 420. The output of the circuit 418 is delivered to detector 422, where the signals are demodulated and the modulation impressed on the modulator frequency amplifier 424 feeding the load device 426.

The stimuli controlling the action of the periodic shunts 414, 420 are derived from a multivibrator 428 having its output connected with a pulse former 430. A portion of the pulse former output drives a coupling device 432 actuating the periodic shunts 414, 420, and another portion of the output of the pulse former 430 is impressed on the comparator 434, which is also excited by the highly selective intermediate frequency amplifier 436 connected to the output of the control signal channel mixer 411. The stimuli resulting from the comparison of the signals in the pulse former 430 and the signals from the intermediate frequency amplifier 436 are impressed on the control unit 438 to govern the frequency and/or phase of the operation of the multivibrator 428.

The circuits 412 and 418 are tuned to present essentially pure resistive impedances to the desired signal. The radio frequency mixer 410 cooperates with the oscillator 405, to deliver an intermediate frequency stimulus of the desired frequency to the circuit 412. The phase shifter 407 is adjusted so that the time of actuation of the shunt circuit 414 occurs substantially at the voltage zeros occurring across the circuit 412 when a signal of the desired frequency and phase is impressed thereon. As the circuit 418 in the output circuit of the amplifier 416 is similarly tuned to present an essentially pure resistive impedance at the desired signal frequency, the position of the voltage zeros in time is the same throughout the circuits 412, 418, despite the phase reversal of the signal waves themselves. Hence, the periodic shunt 420, driven from the coupling device 432, is similarly actuated during the voltage zeros of the desired signal wave when the phase shifter 407 has been properly adjusted with respect to the operation of the circuit 412 of periodic shunt 414.

The highly selective transmission characteristic of the combination of Figure 13 is based upon the cumulative phase shift observed in the transmission of a signal through a train of circuits resonating at a frequency other than the test signal frequency. It is well-known that the phase relationship between the voltage observed across a tuned circuit and the input current thereto varies quite rapidly with change in the impressed frequency; such a phase curve is illustrated on page 122 of "Reference Data for Radio Engineers," third edition, published by Federal Telephone and Radio Corporation. This curve illustrates that the phase shift in a single circuit when the difference between the impressed and resonant frequencies is of the order of 0.1 per cent is eleven degrees. Thus, when the circuit 412 is passing a signal .1 per cent removed from the desired signal frequency without attenuation, it will be suffering an attenuation of at least one-third in the circuit 418, and conversely. At no time, therefore, will the response amplitude to a signal removed by one-tenth of one per cent of the desired signal frequency exceed approximately thirty per cent of the response to the desired signal when circuits having a Q in the range of 100 are employed. Consultation of selectivity characteristic listed in the foregoing and other publications shows that a frequency deviation of this magnitude in a pair of cascaded circuits having a Q of 100 will hardly produce measurable attenuation with respect to the desired signal. The attenuations, of course, increase quite rapidly with further deviation from the desired signal frequency because of the steepness of the plane shift-frequency characteristic and the accumulation or summing up of the phase shift in the progress of the signal through the chain. The use of additional circuits further enhances the selectivity because of the progressive phase shift already noted. If three, rather than two, selective circuits are employed, the phase of the signal at the third circuit, if the impressed frequency deviates from the desired frequency by more than one-tenth of one per cent, is twenty-two degrees, with correspondingly greater attenuation and, if four circuits are employed, this phase shift would be thirty-three degrees. In the latter case, the attenuation of the undesired signal would reduce its peak amplitude to not more than four per cent of the response to the desired signal. Selectivity of this degree is a thing quite unattainable from passive networks of inductance and capacity to date. This performance is the more remarkable, when it is recollected, that because these circuits accept symmetrically disposed signals without additional attenuation beyond that inherent in the L and C alone, there is no corresponding loss of intelligence from the side band energy associated with the incoming signal.

When the free oscillation frequency of the circuits 412, 418 is $$\frac{n}{2}$$

times the frequency of actuation of the periodic shunts 414, 420 ($n=1, 2, 3 \ldots$), the response of the system to interference represented by a step function is essentially as described earlier. It is not intended to indicate that the switching frequency must be identical with or twice the received frequency, as it is apparent that the benefits from the invention will also accrue, though to a lesser degree, if the shunting action is obtained at every second voltage zero or every third voltage zero, etc.

Returning now to a consideration of the transient, the reaction may be summarized simply by saying that the circuit possesses the property of destroying that portion of the energy of the transient which can be resolved into a wave having its voltage peaks falling within the active shunt interval, and will pass without substantial attenuation that portion of the transient produced by the step function which corresponds to a voltage wave whose zeros occur during the periodic shunt actuation.

Thus, it may be said that the arrangement of Figure 13 in which the successive circuits are isochronous with each other at a frequency $$\frac{n}{2}$$

times the frequency of periodic shunt actuation, a very high degree of attenuation of signals asymmetrically disposed about the desired signal frequency in the spectrum is obtained, while signals having components symmetrically disposed about the acceptance frequency of the system, in the manner in which would be expected in an amplitude modulated double sideband wave, are passed without attenuation exceeding or differing from successive exposure of such a signal to a series of selective circuits. Some improvement in signal-to-noise ratio transients may be expected, though this probably lies in the range 3–6 decibels.

To obtain a further improvement in signal-to-noise ratio over the arrangement of Figure 13, while retaining the advantageous selectivity characteristic of the said circuit, the modification illustrated in Figure 14 is indicated. Fundamentally, the departure in the circuit of Figure 14 lies in the fact that the cascaded resonant circuits do not have isochronous free oscillation frequencies. This arrangement requires that the phase of the periodic shunts connected across the oscillatory circuits be independently adjustable. In the receiver of Figure 14, therefore, the antenna 500 is connected with the input of the tuned radio frequency amplifiers 502, 503, the amplifier 502 feeding the signal channel mixer 504 whose output is connected with the tuned circuit 506. A controllable shunt 508 is connected across the circuit 506, and the output of this combination is impressed on the amplifier valve 510 coupled to another tuned circuit 512 paralleled by the shunt 514. The output of these elements is in turn delivered to the detector 516 linked to the modulation frequency amplifier 518 feeding the load device 520.

An oscillator 501 supplies the required locally generated frequency to the mixer 504, its output frequency differing from the received signal frequency by substantially the desired intermediate frequency. In addition, the oscillator feeds a mixer 505, excited from the radio frequency amplifier 503 situated in the control channel. The desired beat energy from the mixer 505 is amplified and subjected to the highly selective action of intermediate frequency amplifier 507 and then delivered to the phase shifters 509 and 521 which permit adjustment of the phase of the voltages controlling the periodic shunts with respect to the desired signal. The source of control voltages for the periodic shunt 508 includes the multivibrator 511 connected with the pulse former 513 which excites the coupling valve 519 and the comparator 515, the latter element also being linked to the output of the phase shifter circuits 509. The control stimulus generated by the comparator 515 is impressed, through the control element 517 on the multivibrator 511 to suitably control its phase and/or frequency with respect to the desired signal wave. In this linkage between the comparator 515 and multivibrator 511, suitable time delay means may be interposed to minimize the effects of momentary loss of the control signal or random variations in its phase or amplitude. The signals from the coupling valve 519 control the periodic shunt 608 substantially in the fashion previously described.

The action of the periodic shunt 514 is controlled from the coupling valve 526 excited from multivibrator 522 through the pulse former 523. A portion of the output signal from the pulse former 523 is also impressed on the comparator 524, receiving signals as well through the phase shifter 521 from the control signal channel and developing a control impulse impressed, via control unit 525 on the multivibrator 522.

The circuits 506 and 512 are adjusted to have mutually differing free oscillation frequencies and one or both may have resonant frequencies differing from the frequency of the desired signal. The difference between their frequencies preferably does not exceed Q divided by their geometric mean frequency for best results. When the apparatus is in operation, phase shifters 509, 521 are adjusted for most efficient transmission of signals at the desired frequency. The detuning from the desired signal frequency is maintained sufficiently low that the natural selective characteristic of the circuits 506, 512 does not interfere unduly with the development of reasonably high gain and the selective characteristic arising from the action of the periodic shunting circuits.

Let us assume now, for example, that one of the circuits 506 is tuned one-tenth of one percent on the high side of the desired signal frequency and the other of the circuits 502 is tuned one-tenth of one per cent on the low side of the desired signal frequency, and that each circuit has a Q of the order of 100. Detuning of this magnitude in the assumed circuit leaves the response to the desired signal substantially unaffected, and the single signal selectivity characteristic does not depart essentially from that illustrated at 404 in Figure 12. As before, the selectivity characteristic presented to a signal of symmetrical nature such as that provided by amplitude modulating a carrier and transmitting both sidebands, is not the selectivity characteristic 404 but rather the combined passive selectivity characteristic of the circuits 506, 512 cascaded, without benefit of the periodic shunting action. The application of a step function to this signal chain produces the well-known shock wave at the free oscillation frequency of the circuit 506. That portion of the energy of the shock wave which may be resolved into a signal having its voltage peaks coinciding with the periods of activation of the shunt 508 is destroyed, and the remaining shock waves are subjected to slightly greater attenuation than that normally incident to such a circuit by virtue of the phase slippage occurring between successive actuations of the periodic shunt. On arriving in the circuit 512, the shock wave sets up a signal which is, however, displaced in phase with respect to the desired signal because of the differing free oscillation frequency in the circuit 512, so that the zeros of the resultant wave do not fall during the intervals of shunt circuit actuation, whereby the shock wave is subjected to considerable additional attenuation, whereas the desired signal is passed without appreciable supplemental attenuation.

Many modifications and variations adapting the invention to specific environments but not departing essentially from the spirit of the invention will be obvious to those skilled in the art, for the widespread use of these principles is expected to permit far more efficient utilization of the necessarily limited radiation spectrum available and to materially extend the operating range of present transmitting facilities.

I claim:

1. In combination, an electric circuit including inductance and capacitance and having a resonant period determined by said inductance and capacitance, and a resistive impedance varying with a period $n/2$ times said resonant period (where "$n$" is any integer) effectively connected in shunt with at least a portion of said capacitance.

2. In combination, an electric circuit including inductance and capacitance and having a resonant period determined at least in part by said inductance and capacitance, a variable conductance connected in shunt with at least a portion of said capacitance, and a control circuit periodically varying said conductance between relatively high values and relatively low values with a period $n/2$ times said resonant period, where "$n$" is any integer.

3. In combination, an electric circuit including inductance and capacitance and having a resonant period determined at least in part by said inductance and capacitance, a controllable conductance connected in shunt with at least a portion of said capacitance, and a control circuit periodically varying said conductance between relatively high values and relatively low values in a manner essentially independent of forced oscillations appearing in said circuit and with a period of substantially half said resonant period.

4. In combination, an electric circuit including inductance and capacitance and having a resonant period determined at least in part by said inductance and capacitance, a controllable conductance operatively shunted across at least a portion of said capacitance, and a control circuit periodically varying said conductance between relatively high values and relatively low values with a period related in predetermined manner to said resonant frequency and a high value duration of less than one ninth said resonant period.

5. In combination, an oscillatory electric circuit with less than critical damping, a network of controllable energy absorbing properties operatively associated with said circuit, a control device influencing the energy absorbing properties of said network, and a signal source connected with said control device supplying a signal enhancing said energy absorbing properties for time intervals not substantially exceeding one ninth the natural period of said electric circuit.

6. In combination, an oscillatory electric circuit with less than critical damping, a network of controllable energy absorbing properties operatively associated with said circuit, a control device influencing the energy absorbing properties of said network, a signal source supplying stimuli with a repetition rate of the order of twice the natural frequency of oscillation of said electric circuit and a duration not substantially exceeding one ninth the natural period of said electric circuit, and a connection between said signal source and said control device.

7. In combination, a first signal line, an oscillatory electric circuit with less than critical damping adapted for excitation in response to signals appearing on said first signal line, a network of controllable energy absorbing properties operatively associated with said circuit, a control device influencing the energy absorbing properties of said network, a controllable signal source supplying to said control device stimuli having a time duration not substantially exceeding one ninth the natural period of said electric circuit, and control apparatus varying the repetition rate of said controllable signal source in accordance with signals appearing on said first signal line.

8. In combination, an oscillatory electric circuit with less than critical damping resonant at a predetermined frequency, a network of controllable energy absorbing properties operatively associated with said circuit, a control device influencing the energy absorbing properties of said network with a periodicity different from that at which successive high absorption intervals would be caused to fall on a wave of said predetermined frequency at points separated by $n\pi$ ("$n$" is an integer), said difference not exceeding the Q of said electric circuit divided into 0.5 when expressed proportionately.

9. The method of enhancing the frequency discriminating properties of a frequency selective network which comprises absorbing energy from a region of said network at times when, in the presence of the desired signal, there would be no stored energy.

10. In electrical communicating apparatus, a signal line, first and second oscillatory electric circuits with less than critical damping adapted for excitation in response to signals appearing on said signal line, a first periodically active energy absorbing circuit associated with said first electric circuit, a second periodically active energy absorbing circuit associated with said second electric circuit, and phase adjusting apparatus relatively adjusting the phases of the operating stimuli and signals to cause the energy absorption from said electric circuits to occur at times displaced by a substantially integral number of right angles on the input wave supplied to said electric circuits.

11. In combination, a signal line, an oscillatory electric circuit with less than critical damping, a network having periodically varying energy absorbing properties associated with said electric circuit, and a transmission network characterized by a more sharply selective frequency-transmission characteristic than said oscillatory circuit connected in controlling relation between said signal line and said energy absorbing network.

12. In electric wave responsive apparatus, a first oscillatory electric circuit with less than critical damping characterized by a predetermined resonant frequency and Q, a second oscillatory electric circuit with less than critical damping characterized by a predetermined resonant frequency and Q, the ratio of resonant frequency to Q of said first electric circuit being greater than the ratio of resonant frequency to Q of said second electric circuit, and an energy absorbing network associated with said second electric circuit absorbing energy therefrom for time intervals not substantially exceeding one ninth the period of said second resonant frequency and a repetition rate related in predetermined manner to said second resonant frequency.

13. In combination, a first electric valve having input and output electrodes interconnected to reduce the apparent impedance of said valve during the operation of said valve and characterized by the passage of an electric current during the operation of said first valve, a second electric valve adapted to draw an electric current comparable with that passing incidental to the operation of said first valve operatively connected in parallel with said first valve, and a control circuit alternatively disabling said valves.

14. In combination, an electrode structure adapted to project a beam of charged particles, a control electrode adapted to establish and interrupt said beam, a pair of control deflecting electrodes disposed on either side of the normal course of said beam, a pair of target electrodes situated beyond said deflecting electrodes in the direction of beam travel, a connection between one of said deflecting electrodes and one of said target electrodes, and a connection between the other of said deflecting electrodes and the other of said target electrodes, the poling of said connections being such that the apparent impedance between said deflecting electrodes is reduced in the presence of said beam.

15. In combination, first and second signal lines adapted for symmetrical excitation, a first set of unilateral conductors connected in opposition with a first polarity between said signal lines, a second set of unilateral conductors connected in opposition with reverse polarity between said signal lines, and an exciting circuit simultaneously applying opposite polarities to the junction points within said sets.

16. In signal responsive apparatus, a first oscillatory electric circuit having less than critical damping, a second oscillatory electric circuit having less than critical damping adapted for excitation from said first circuit said circuits being tuned to substantially the same frequency, a first controllable energy absorber associated with said first circuit, a second controllable energy absorber associated with said second circuit, and control apparatus periodically varying the energy absorbing properties of said energy absorbers, said periodic variation occurring at a frequency substantially $2/n$ times the tuned frequency of said first and second circuits, where "$n$" is any integer.

17. In signal responsive apparatus, a first oscillatory electric circuit having less than critical damping and a first resonant frequency, a second oscillatory electric circuit having less than critical damping and a second resonant frequency different from said first resonant frequency, a first controllable energy absorber associated with said first circuit, a second controllable energy absorber associated with said second circuit, and control apparatus periodically varying the energy absorbing properties of said energy absorbers.

GEORGE V. ELTGROTH.

REFERENCES CITED

The following references are of record in the file of this patent:

UNITED STATES PATENTS

| Number | Name | Date |
|---|---|---|
| 1,794,878 | Weagant | Mar. 3, 1931 |
| 2,269,140 | Bruck | Jan. 6, 1942 |
| 2,393,785 | Leeds | Jan. 29, 1946 |
| 2,428,126 | Nicholson | Sept. 30, 1947 |
| 2,448,558 | Stodola | Sept. 7, 1948 |
| 2,477,963 | Chapin | Aug. 2, 1949 |